United States Patent [19]
Holston

[11] Patent Number: 5,755,317
[45] Date of Patent: May 26, 1998

[54] METHOD AND APPARATUS FOR SEPARATING A STREAM OF UNITS OF PRODUCT INTO DISCRETE GROUPS

[75] Inventor: Thomas Raymond Holston, Appleton, Wis.

[73] Assignee: Kimberly-Clark Worldwide, Inc., Neenah, Wis.

[21] Appl. No.: 381,166

[22] Filed: Jan. 31, 1995

[51] Int. Cl.$^6$ .............................. B65G 17/32; B65G 47/34
[52] U.S. Cl. ...................... 198/484.1; 198/703; 198/712; 198/713
[58] Field of Search ............................ 198/419.1, 419.2, 198/459.6, 465.1, 465.3, 461.2, 461.3, 703, 706, 707, 711, 712, 713, 714, 795, 803.01, 803.2, 484.1

[56] References Cited

U.S. PATENT DOCUMENTS

| | | | |
|---|---|---|---|
| 4,154,333 | 5/1979 | Lapeyre | 198/707 |
| 4,307,800 | 12/1981 | Joa | 198/374 |
| 4,325,475 | 4/1982 | Spalding | 198/429 |
| 4,399,905 | 8/1983 | Lance et al. | 198/422 |
| 4,523,671 | 6/1985 | Campbell | 198/422 |
| 4,751,997 | 6/1988 | Hirsch | 198/407 |
| 4,768,642 | 9/1988 | Hunter | 198/419.2 |
| 4,802,570 | 2/1989 | Hirsch et al. | 414/790 |
| 4,927,322 | 5/1990 | Schweizer et al. | 414/794.7 |
| 5,127,209 | 7/1992 | Hunter | 53/439 |
| 5,176,244 | 1/1993 | Radzins et al. | 198/430 |
| 5,226,524 | 7/1993 | Guttinger et al. | 198/803.01 X |

FOREIGN PATENT DOCUMENTS

0101144A3  2/1984  European Pat. Off. .

*Primary Examiner*—F. J. Bartuska
*Attorney, Agent, or Firm*—Mark L. Davis

[57] ABSTRACT

This invention pertains to apparatus and methods for receiving a stream of units of product, such as from a manufacturing operation, separating the stream into discrete groups of product, in a product carrier bucket, and typically presenting each group for further processing at a subsequent processing station as a group. A novel product bucket is disclosed, including articulated buckets which are typically engaged by a driver, about a first path, while receiving units of product, and are subsequently disengaged from the driver for traversing along a second path to a subsequent processing station. The buckets preferably have cam followers which cooperate for urging the rear wall of a leading bucket and the front wall of a trailing bucket into proximity with each other while traversing an arcuate portion of the first path. Product-receiving compartments may be enlarged for receiving product, and contracted for holding product contained therein. Thickness of respective compartment walls is selected for uniform timing and registration of the compartments at the product filling station.

16 Claims, 5 Drawing Sheets

METHOD AND APPARATUS FOR SEPARATING A STREAM OF UNITS OF PRODUCT INTO DISCRETE GROUPS

FIELD OF THE INVENTION

This invention relates to material handling apparatus for receiving a stream of units of product, such as from a manufacturing operation, separating the stream into discrete groups of product, each group having the same number of units of product, and presenting each group for subsequent processing as a group, such as for packaging.

BACKGROUND OF THE INVENTION

Stacking machines are known for receiving units of product from a generally continuous stream of product, each unit of product being received into a separate receiving compartment on the stacking machine. In known stacking machines, such as those available from Curt G. Joa, inc., Boynton Beach, Fla., the compartments are permanently mounted to a closed loop driven chain or like conveyor. The art contemplates various means for transferring the units out of the stacker in groups.

The art, to the extent known, does not contemplate receiving units of product from the continuous product stream into discrete product-carrying buckets in the stacking operation, wherein each discrete product-carrying bucket receives the number of units of product associated with a group, and wherein the carrying buckets are then readily separated from the stacking operation, still carrying the units of product, for presentation of the now-segregated group of units of product to a subsequent processing station.

It is an object of this invention to provide material handling apparatus including a product bucket adapted to be engaged with, and driven by, a driver to thus traverse a loading zone in a stacking-type operation, and to be disengaged from the driver, with its load of product, and to traverse a subsequent path for presenting its group of units of product to a subsequent processing station.

It is a further object to provide such a product bucket as an articulated bucket having front and rear cam followers, cooperating with corresponding cams which urge corresponding front and rear walls of respective leading and trailing ones of the buckets into proximity with each other while the respective buckets traverse an arcuate path such as at a loading zone.

It is another object to provide such a bucket wherein the cam followers are arranged to enlarge the product-receiving compartments when the respective bucket passes about an arcuate path such as at a loading zone.

It is yet another object to provide such a bucket wherein the sum of the thicknesses of the front and rear walls corresponds with the thickness of an intermediate wall.

Still another object is to provide apparatus for receiving a continuous stream of product, and for segregating the product stream into discrete groups of units, using the above suggested product buckets.

Yet another object is to provide a method including receiving a stream of product in the buckets and thereby separating the stream into discrete groups of product, each group having the same number of units of product, segregating each group from the product stream, and presenting it, as a group, to a subsequent processing station.

SUMMARY OF THE INVENTION

This invention describes a product bucket for receiving a specified number of units of material as a group, such as from a continuous stream of such units arriving from a manufacturing operation, segregating the group from the continuous stream of such units, and presenting the group for further processing, such as for packaging.

In a first family of embodiments, the invention describes an articulated product bucket adapted to be engaged by a driver travelling in a first path, as one of at least a first leading and a second trailing discrete and separate such product buckets engaged by such driver, and to travel along first and second spaced cams extending along a second path, a first portion of the first path corresponding with a second portion of the second path, the articulated product bucket comprising a front bucket element having a first base, and a front bucket wall extending outwardly from the first base; a rear bucket element having a second base, and a rear bucket wall extending outwardly from the second base; a product-receiving zone between the front bucket wall and the rear bucket wall for receiving product thereinto, the rear bucket element being mounted to the articulated product bucket for articulation with respect to the front bucket element, thereby to articulate the rear bucket wall with respect to the front bucket wall, to thereby enlarge the product-receiving zone for receiving a product thereinto and to contract the product-receiving zone to hold the product therein; a first cam follower on the front bucket element, adapted to engage the first cam; and a second cam follower on the rear bucket element, adapted to engage the second cam, the first and second cam followers being arranged with respect to the front and rear bucket walls, and with respect to the first and second cams, to urge the rear bucket wall of a leading articulated product bucket and the front bucket wall of a trailing and abutting articulated product bucket into proximity with each other while the corresponding leading and trailing articulated product buckets traverse an arcuate path, one immediately behind the other, along the first and second spaced cams, thereby to inhibit product from being inserted between the rear bucket wall of the leading articulated product bucket and the front bucket wall of the trailing articulated product bucket while the corresponding articulated product buckets are traversing the arcuate path.

In some embodiments, at least one of the front and rear bucket elements includes a bottom wall adapted to extend generally transverse to the second path, from the at least one of the front and rear bucket elements toward the other of the front and rear bucket elements.

In some preferred embodiments, the articulated product bucket has first and second sides, generally adjacent the respective first and second spaced cams, the front bucket element and the rear bucket element, in combination, having first and second cam followers on each of the first and second sides of the articulated product bucket.

It is preferred that the articulated product bucket be adapted to traverse the second path, the second path being different from the first path, such that the articulated product bucket is engaged for positive driving by a first driver for the corresponding portion of the first and second paths, and is disengaged from the first driver, and engaged by a second frictional driver for traversing at least a portion of the remainder of the second path. Thus, preferably the articulated product bucket includes a drive lug for separably engaging a drive dog on the first driver.

In preferred embodiments, the articulated product bucket has a front and a rear and comprises at least three bucket elements, the product-receiving zone comprising at least two compartments, each compartment being defined by adjacent bucket elements, including corresponding compartment walls on each bucket element, extending outwardly from corresponding bases, each such compartment having a front compartment wall and a rear compartment wall, the rear compartment wall on a given compartment comprising the front compartment wall with respect to the next rearwardly disposed compartment, the compartment walls in the articulated product bucket comprising the front bucket wall in a first front compartment, the rear bucket wall in a last rearwardly disposed compartment, and at least one intermediate compartment wall between the front bucket wall and the rear bucket wall.

Preferably, each compartment wall has a thickness, the thickness of each intermediate compartment wall corresponding with the sum of the thicknesses of the corresponding front bucket wall and the corresponding rear bucket wall.

In another family of embodiments, the invention describes an articulated product bucket as above wherein the first and second cam followers are arranged with respect to the front and rear bucket walls, and with respect to the first and second cams, to articulate the bucket elements with respect to each other, and thereby to enlarge the product-receiving zone when the first and second cam followers pass about an arcuate path with the front and rear bucket walls extending outwardly from the first and second bases and outwardly of the arcuate path, with the degree of enlargement of the product-receiving zone being related to the radius of the arcuate path, and to contract the product-receiving zone about product therein when the first and second cam followers pass out of the arcuate path.

In general, the articulated product bucket is adapted to travel in positive engagement with the first driver for a portion of the first path, and to be subsequently disengaged from the first driver for travel along a remaining portion of the second path.

In a third family of embodiments, the invention describes apparatus for receiving a substantially continuous stream of product units, and segregating the substantially continuous stream into discrete groups of product units, each discrete group containing the same number of units of product, the apparatus comprising a driver, travelling in a first path; a cam element extending along a second path, a first portion of the first path corresponding with a second portion of the second path; and a driven articulated product bucket, including a drive lug for separably engaging the driver, the articulated product bucket having a cam follower for engaging the cam element along the second path, the articulated product bucket including a front bucket element having a first base, and a front bucket wall extending outwardly from the first base, a rear bucket element having a second base, and a rear bucket wall extending outwardly from the second base, a product-receiving zone between the front bucket wall and the rear bucket wall, for receiving product thereinto, the front bucket element being mounted to the articulated product bucket for articulation with respect to the rear bucket element, thereby to articulate the front bucket wall with respect to the rear bucket wall, to thereby enlarge the product-receiving zone for receiving product thereinto and to contract the product-receiving zone to hold the product therein.

Preferably, the cam element comprises first and second cams, the articulated product bucket having first and second sides, corresponding generally with the first and second spaced cams, the front bucket element and the rear bucket element, in combination, having first and second cam followers on each of the first and second sides of the articulated product bucket for engaging the first and second cams.

Also preferably, the articulated product bucket is adapted to traverse the second path, the second path being different from the first path, such that the articulated product bucket is engaged for positive driving by a first driver for the corresponding portion of the first and second paths, and is disengaged from the first driver for traversing the remainder of the second path.

In preferred embodiments, the articulated product bucket has a front and a rear and comprises at least three bucket elements, the product-receiving zone comprising at least two compartments, each compartment being defined by adjacent bucket elements, including corresponding compartment walls on each bucket element, extending outwardly from corresponding bases, each such compartment having a front compartment wall and a rear compartment wall, the rear compartment wall on a given compartment comprising the front compartment wall with respect to the next rearwardly disposed compartment, the compartment walls in the articulated product bucket comprising the front bucket wall in a first front compartment, the rear bucket wall in a last rearwardly disposed compartment, and at least one intermediate compartment wall between the front bucket wall and the rear bucket wall.

Preferably, each such compartment wall has a thickness, the thickness of each intermediate compartment wall corresponding with the sum of the thicknesses of the front bucket wall and the rear bucket wall.

In a fourth family of embodiments, the invention comprehends a method of receiving a stream of units of product, and separating the stream into discrete groups of product. The method comprises the steps of receiving the units in processing apparatus comprising a succession of articulated product buckets, each bucket being adapted to be engaged for positive driving by a driver travelling in a first path, and to travel along a cam element extending along a second path, a first portion of the first path corresponding with a second portion of the second path, each product bucket having a cam follower for engaging the cam element along the second path, and including a front bucket element having a first base and a front bucket wall extending outwardly from the first base, a rear bucket element having a second base and a rear bucket wall extending outwardly from the second base, a product-receiving zone between the front bucket wall and the rear bucket wall, for receiving product thereinto, the front bucket element being mounted to the articulated product bucket for articulation with respect to the rear bucket element, thereby to articulate the front bucket wall with respect to the rear bucket wall, to thereby enlarge the product-receiving zone for receiving product thereinto and to contract the product-receiving zone to hold the product therein, such that each bucket receives a group of such units of product including a unit of product in each compartment; segregating the groups of product from the product stream; and presenting each group, as a separate group, to a downstream element of the processing apparatus, for further processing.

The method may include the step of passing each bucket along an arcuate path, and thereby enlarging the respective compartments in the respective bucket in preparation for receiving the units of product therein, and receiving the units of product in the respective compartments while the compartments are so enlarged.

The method may further include the step of passing each bucket out of the arcuate path after the respective bucket receives product into the respective compartments, and thereby contracting the respective compartments to hold the units of product therein.

In preferred embodiments, the method includes engaging each bucket with the driver for positive driving along a first portion of the first path coincident with the second path, and disengaging the respective buckets from the driver and traversing the buckets along a remaining portion of the second path with the driver disengaged from the respective buckets.

BRIEF DESCRIPTION OF THE DRAWINGS

The present invention will be more fully understood and further advantages will become apparent when reference is made to the following detailed description of the invention and the drawings, in which.

DETAILED DESCRIPTION OF THE ILLUSTRATED EMBODIMENTS

The following detailed description is made in the context of receiving, in manufacturing, material handling, or like apparatus, a generally continuous stream of units of product from a manufacturing operation and separating the continuous stream of units of product into discrete groups of product, each group into its own product bucket, for transporting the respective group, and presenting the group for further processing at a subsequent processing station. Given the disclosure here, those skilled in the art will recognize that the apparatus and methods disclosed can be applied to other systems, processes, and situations.

Figure 1:
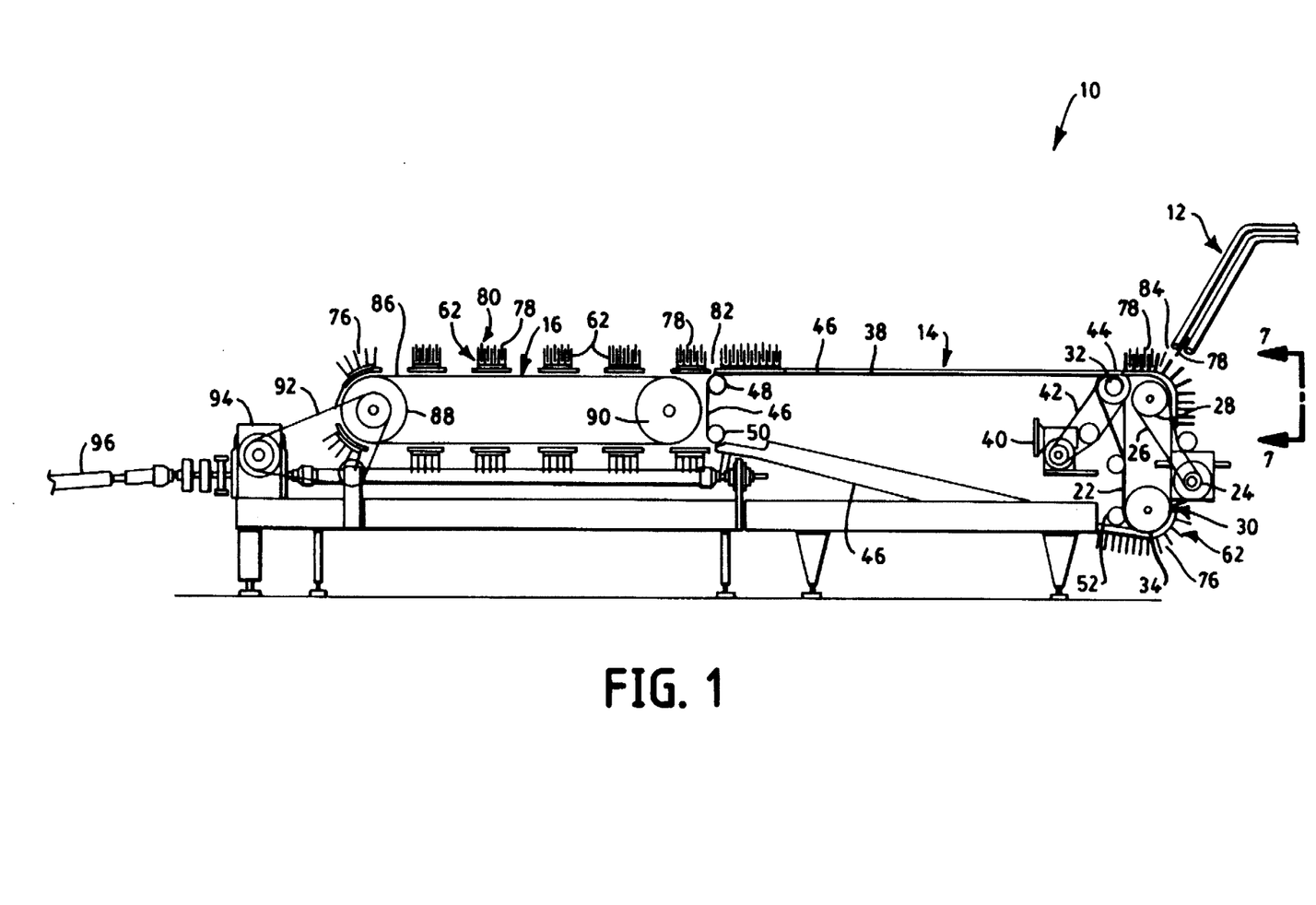
FIG. 1 is a side elevation view of apparatus of the invention, including showing a plurality of product buckets arranged to receive a stream of product, to segregate the stream into discrete groups, and to present the groups, in the buckets, to a subsequent processing station.

Referring now to the drawings, FIG. 1 shows a side elevation view of a portion of a processing system incorporating the apparatus and methods of the invention. FIG. 1 illustrates a preferred embodiment. In FIG. 1, the processing apparatus 10 includes a product delivery conveyor 12, a group segregation subsystem 14, and a group processing subsystem 16.

The group segregation subsystem 14 includes a first driving apparatus including endless chain 22, driven in a first continuous loop path 30 by gear box 24, through belt 26 linking the gear box to the chain at drive sprocket 28. Endless chain 22 travels first path 30 about the drive sprocket 28, upper turning sprocket 32, and lower turning sprocket 34. Chain 22 incorporates therein a plurality of spaced drive dogs 36 for use as described hereinafter. See FIG. 7.

Figure 7:
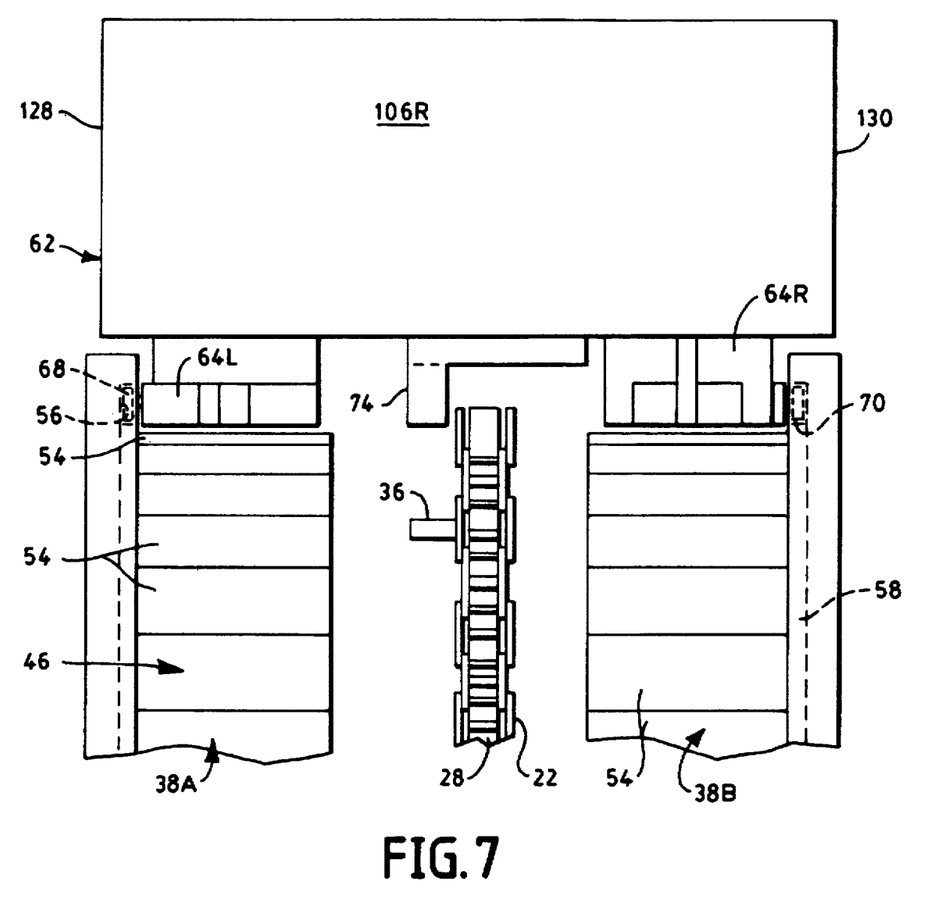
FIG. 7 is a front elevation view of a fragment of the apparatus of FIG. 1, taken at 7—7 of FIG. 1, and showing a rear elevation of the respective product bucket of FIG. 2.

The group segregation subsystem 14 further includes a second driving apparatus including endless conveyor 38, driven in a second continuous loop path 46 by gear box 40, through belt 42 linking the gear box to the conveyor 38 at drive sprocket 44. Endless conveyor 38 travels second path 46 about the drive sprocket 44, upper turning sprocket 48, and lower turning sprockets 50 and 52. Referring to FIG. 7, endless conveyor 38 includes a left segment 38A and a right segment 38B, on corresponding left and right sides of the second path 46, the left and right segments 38A and 38B being driven in unison for uniform advancement of the respective links 54 of the respective segments 38A and 38B of the conveyor 38.

Left and right cams 56 and 58 respectively circumscribe a third combined path 60 traversing a portion of the first path 30 from lower turning sprocket 34 to drive sprocket 28 to upper turning sprocket 32, and a portion of the second path 46 from upper drive sprocket 44 to upper turning sprocket 48, thence along group processing subsystem 16 to and around drive sprocket 88, thence to turning sprocket 90, thence to lower turning sprocket 50 and back into the second path 46, along the second path 46 to lower turning sprocket 52, and completes the traverse of the third combined path 60 by passing thence back to the first path 30 at lower turning sprocket 34, on corresponding left and right sides of the drive chain 22 and the endless conveyor 38. As illustrated in FIG. 7, the cams 56, 58 generally parallel the respective left and right segments 38A and 38B of conveyor 38 along the respective portion of the second path 46, and continue parallel to each other, and similarly spaced from each other, as they traverse generally along the first path 30 in concert with the driven endless chain 22. The relative relationship of the cams 56, 58 to the driven chain 22, and the driven conveyor 38 is seen in FIG. 7. As seen in FIG. 7, the first and third paths are coextensive, and thus correspond with each other with respect to driving the product buckets 62, from sprocket 34, about sprocket 28, and to sprocket 32.

Further referring to FIG. 7, there is seen the product bucket 62 frictionally interfacing at links 54 of conveyor 38 at left and right base members 64 and interfacing with cams 56, 58 at left and right cam followers 68, 70. In the illustration shown in FIG. 7, the drive dog 36 has just left driving engagement with the product bucket 62 at drive lug 74.

Referring again to FIG. 1, the product buckets 62 traverse the apparatus 10 about the third combined path 60. As illustrated, each product bucket 62 has four product-receiving compartments 76 spanning a product-receiving zone 72, for receiving units of product 78 from the product delivery conveyor 12 as the respective product buckets 62, and corresponding compartments 76 traverse the arcuate path about drive sprocket 28 adjacent product delivery conveyor 12. Accordingly, each product bucket 62 receives four units of product 78 into the four respective compartments 76. As will be seen hereinafter, each bucket 62, with its group 80 of four units of product can be separated from all other buckets, from all other units of product, and from all other groups of units of product, such that each group 80 takes on an identity of its own, and can be handled subsequently in the processing as a group, either in the product bucket 62, or after being removed from the product bucket. Thus, the product bucket 62 is a tool for segregating a stream of units of product into discrete groups of units of product, for subsequent separate handling of each group.

Still referring to FIG. 1, a series of product buckets 62 are arrayed in abutting relationship, one behind the other, from lower sprocket 34 to and around drive sprocket 28, with some of buckets cut away in the illustration of FIG. 1 to show gear box 24. As the buckets pass upwardly toward and around sprocket 28, each bucket is engaged, at its drive lug 74, by a respective drive dog 36 on chain 22. As each bucket is driven past product delivery conveyor 12, a unit of product 78 is deposited into each compartment 78 of the respective bucket, whereby each compartment of each bucket contains one unit of product. Similarly, multiple units of product could be placed into each compartment 78.

After the units of product are deposited into the compartments 78 at product delivery conveyor 12, the cooperation of the cams 56, 58, and the cam followers 68, 70, as shown in FIG. 7, guide the respective bucket along the combined path 60, and out of engagement with the drive dog 36 on chain 22. As the bucket passes out of engagement with the drive dog 36, the next following bucket, still being in driven engagement with chain 22, pushes it from behind, urging the bucket into frictional engagement with the top surfaces of links 54 of conveyor 38. The frictional engagement between the links 54 and the respective base members 64 of the bucket urges the bucket along the top surface of conveyor 38. Since the drive imparted by the conveyor 38, to buckets 62, is limited to the frictional engagement between the links 54 and the base members 64 of the buckets, the underlying links 54 can slip past the buckets 62 to the extent the buckets are otherwise impeded from being driven along the path traversed by the conveyor 38. Accordingly, the conveyor 38 can move continuously at a steady driving pace, urging the buckets toward its discharge end 82, thereby serving to accumulate buckets as necessary according to its frictional slip engagement with the buckets. Thus, conveyor 38 serves as an accumulator between the product filling station 84 adjacent product delivery conveyor 12 on sprocket 28, and the discharge end 82.

Group processing subsystem 16 includes endless conveyor 86 passing around drive sprocket 88 and turning sprocket 90. Drive sprocket 88 is driven by belt 92 from gearbox 94, which is driven by line shaft 96.

On demand from the group processing subsystem 16, the buckets 62, with their groups of units of product therein, are released individually, at spaced intervals, to conveyor 86 on group processing subsystem 16. On group processing subsystem 16, the group 80 of units of product 78 in each bucket 62, is removed from the respective bucket for further processing, such as for packaging.

After the group of units of product has been removed from a respective product bucket, the bucket passes about sprocket 88. Thus, in the illustrated embodiment, each group 80, corresponding to each respective bucket 62, represents the amount of product, namely four units 78, to be placed in a carton as a unit pack of product for distribution to the consumer. The number of units of product to be placed in a respective carton can readily be changed by changing the number of compartments 78 in the buckets 62.

Indeed, the invention contemplates that the number of compartments could vary from product bucket to product bucket, within the combined path 60 at a given time. As will be seen hereinafter, the invention contemplates product buckets 62 which comprise a plurality of bucket elements, each corresponding generally to one compartment 78, with the capability of readily adding to, or subtracting from, the number of bucket elements, and thus the number of compartments. Accordingly, using a limited number of different standard parts, buckets can be assembled with any desired number of compartments within a wide range, thus to receive a corresponding number of units of product. Similarly, elements can be added to increase the number of compartments in a respective product bucket, and can be deleted to reduce the number of compartments in a respective product bucket. The minimum number of compartments is one compartment, using two bucket elements. In principle, any number of compartments greater than one can be obtained by adding one bucket element for each compartment to be added.

Figure 2:
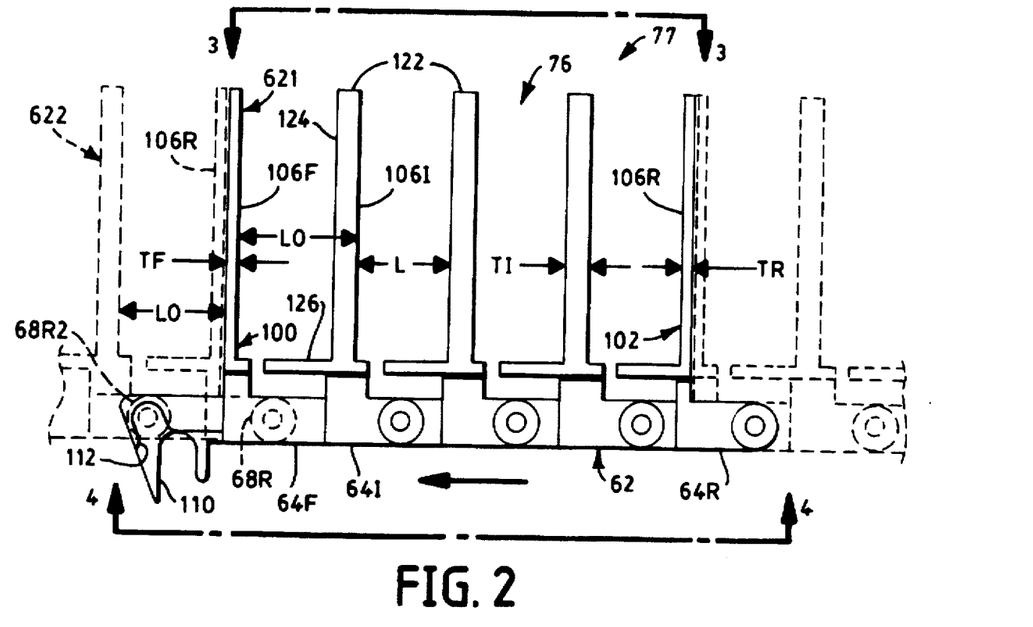
FIG. 2 is a side elevation view of a first embodiment of a product bucket of the invention, with fragments of preceding and following buckets shown in dashed outline.
Figure 3:
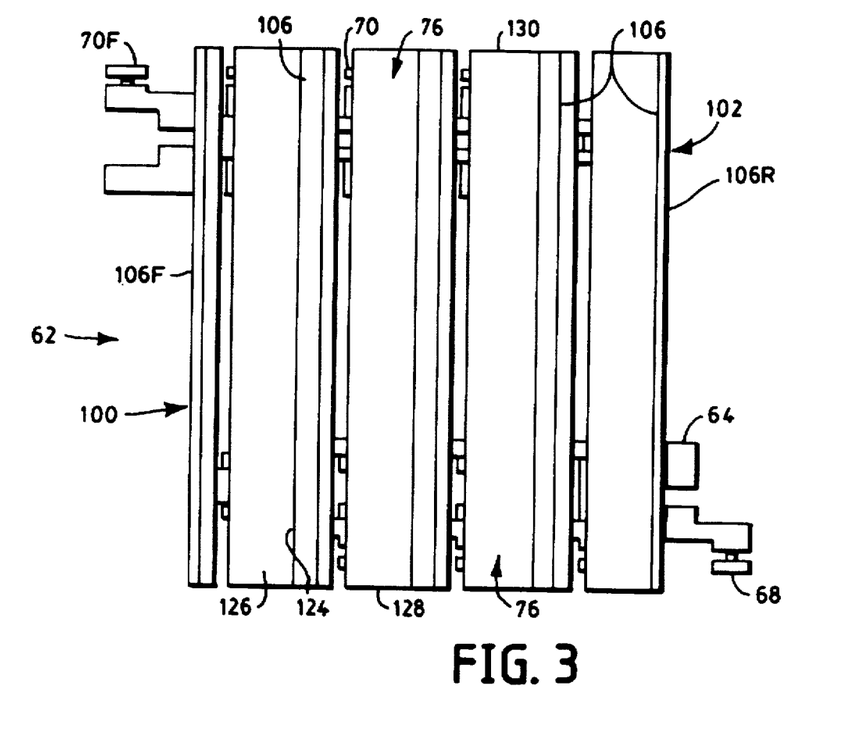
FIG. 3 is a top view of the product bucket of FIG. 2, taken at 3—3 of FIG. 2.
Figure 4:
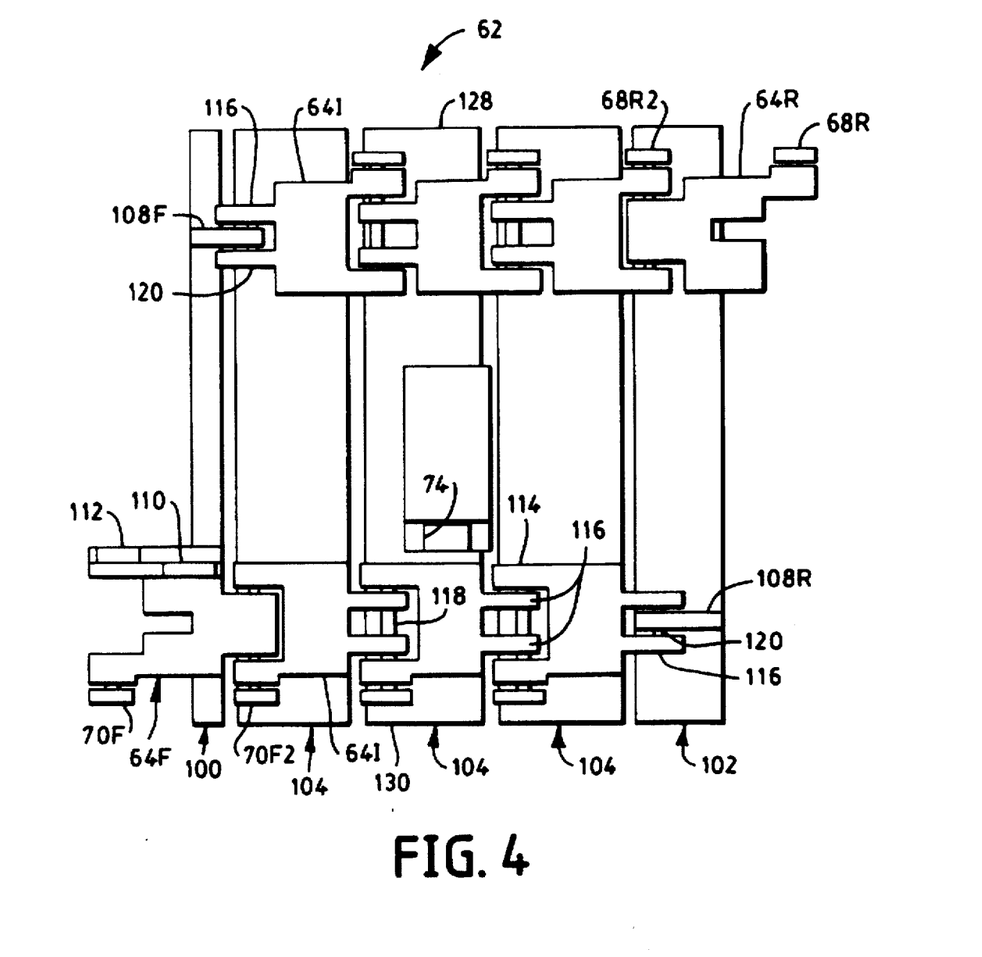
FIG. 4 is a bottom view of the product bucket of FIG. 2, taken at 4—4 of FIG. 2.

Attention is turned now to FIGS. 2–4, and a discussion of the structure of the product buckets 62. As illustrated in FIGS. 2–4, and turning attention to FIG. 4, each product bucket 62 includes a front bucket element 100, a rear bucket element 102, and three intermediate bucket elements 104. Front bucket element 100 includes a front base member 64F, a front bucket wall 106F extending outwardly from the front base member 64F, and a front support bracket 108F. Front base member 64F includes first and second drive lugs 110 and 112, and a right cam follower 70F.

Rear bucket element 102 includes a rear base member 64R, a rear bucket wall 106R extending outwardly from the rear base member 64R, and a rear support bracket 108R. Rear base member 64R further includes a left cam follower 68R.

Each of the three intermediate bucket elements 104 includes left and right base members 64I, and an intermediate bucket wall 106I extending outwardly from the respective intermediate base member 64I. Each base member 64I includes a clevis 114, and a pair of fingers 116 extending to engage a corresponding linking member of an adjacent bucket element. The fingers 116 on the most rearwardly disposed right clevis engage the rear wall support bracket 108R. The fingers 116 on the most frontwardly disposed left clevis engage the front wall support bracket 108F. The clevis on the most frontwardly disposed base member 64I engages a rear portion of the front base member 64F corresponding to fingers 116. The clevis on the most rearwardly disposed base member 64I engages a front portion of the rear base member 64R corresponding to the fingers 116.

A separate linking pivot pin 118 engages each respective cam follower 68I, 70I on the intermediate bucket elements, passes through the respective clevis and the corresponding fingers 116 or rear portion of the respective front base member, or front portion of the respective rear base member, to thereby link the respective clevis and fingers, and thus the respective bucket elements for pivotation with respect to each other.

A separate linking pivot pin 120 extends through each respective pair of fingers 116 and the respective wall support bracket 108 to thereby link the brackets and fingers, and thus the respective bucket elements for pivotation with respect to each other.

Given the above description, it is seen that the product bucket 62 can be constructed using three primary types of bucket elements, the front bucket element 100, the rear bucket element 102, and one or more intermediate bucket elements as desired. If the bucket is to have only one compartment, only the front and rear bucket elements are used. One additional compartment is added, over one, as each intermediate element is added. Bucket elements are added or deleted by inserting, and or retracting a respective pair of pivot pins 118 along with respective cam followers 68, 70, with respect to the affected bucket element.

Since all of the connecting linkages through the linking pivot pins 118 and 120 provide for pivotation of the linked members with respect to the pivot pins, each bucket element can be pivoted, also mentioned herein as articulated, with respect to the next adjacent bucket elements in that respective bucket. Accordingly, as the bucket passes about an arcuate path, such as at drive sprocket 28, with the cam followers 68, 70 in the respective cams 56, 58, the respective bucket elements pivot with respect to each other about the arcuate path, thereby enlarging the respective compartments by enlarging the distance between the respective walls 106 at their distal ends 122 as illustrated in FIG. 1. Each respective compartment then receives the unit of product while the compartment is so enlarged. As the bucket passes out of the arcuate portion of the path 30, the distal ends 122 are restored to their previous parallel positions shown in e.g. FIG. 2, whereby the compartment contracts about the product. Thus are the compartments enlarged in preparation for receiving the units of product therein, by the tracking of the respective cam followers in the respective cams about the arcuate path, and subsequently contracted about the product as the cam followers 68, 70 track the cams 56, 58 out of the arcuate segments and into a straight segment of the cams.

Referring especially to FIGS. 2 and 4, the front wall 106F of a first product bucket 621 is supported in the right cam 58 by the two front-most right cam followers 70F and 70F2. As illustrated in FIG. 2, the rear wall 106R of a second (next preceding) product bucket 622 is disposed in abutting relationship with the front wall 106F of the first product bucket 621. The rear wall 106R of the second product bucket 622 is supported in the left cam 56 by the two rear-most left cam followers 68F and 68F2. As suggested by FIGS. 2 and 4, the two cam followers 70F and 70F2 supporting the front wall 106F of the respective trailing product bucket and the two cam followers 68F and 68F2 supporting the rear wall 106R of the leading product bucket occupy like positions along the paths of the respective cams 56 and 58. Thus, the four cam followers 68F, 68F2, 70F, and 70F2 supporting the front wall of one bucket and the rear wall of a preceding bucket act as two pairs of cam followers, each pair being aligned perpendicularly across the path 60 from the other, such that the adjacent front and rear walls are being urged into proximity with each other, for example such that the walls are urged into abutting relationship with each other. Thus, as the buckets traverse the arcuate path at the product filling station 84, the adjacent front and rear walls tend to simultaneously track the same portion of the arcuate path, and thus to act as a single wall unit, with the respective front and rear walls in abutting, or nearly abutting, relationship with each other, thereby inhibiting, and indeed insuring, that product cannot be inserted between the rear bucket wall 102 and the next following front bucket wall 100.

The sum of thicknesses "TF" and "TR" of the front and rear walls 100 and 102 respectively correspond to the thickness "TT" of the intermediate walls 104. Thus, the effective thickness of a combination of front and rear walls is the same as the effective thickness of any one intermediate wall 104. The front-to-rear length "L" of all the compartments is the same. Since the front-to-rear length "L" of the compartments, between the respective compartment walls is uniform, and since the effective thickness of an intermediate wall 104 is the same as the effective thickness of the combination of a front wall 100 and a rear wall 102, the overall length "L0" of any one compartment 78 is the same as the overall length "L0" of any other compartment, and the buckets can be presented for filling without regard to whether the compartment to be filled is a front compartment, a rear compartment, or an intermediate compartment. Of course, deviations in the thickness of the walls, or the combined thicknesses of the front and rear walls can be compensated for by corresponding deviations in the length "L" of the respective compartments 76. The critical length is the overall length "L0."

To the contrary, if the front and rear walls were the same thickness as the intermediate walls, the registered distance between two intermediate compartments would be different from the distance between an intermediate compartment and a front or rear compartment, by the thickness of the second wall that makes up the front wall/rear wall combination at each end of the bucket.

Each compartment has, with respect to the compartment, a front compartment wall 106 at its front and a rear compartment wall 106 at its rear. With reference to especially FIGS. 2-4, the rear compartment wall on a given compartment thus is the front compartment wall with respect to the next rearwardly disposed compartment.

As a unit of product 78 is inserted into a respective compartment 76 it drops from the product delivery conveyor 12 into the bucket, and preferably onto and against the surface 124 of the wall at the rear of the respective compartment and preferably against the bottom wall 126, which, as shown, extends generally transverse to the path being traversed by the bucket along combined path 60.

The product bucket 62 has first and second sides 128, 130 respectively corresponding generally with, and traversing adjacent to, the respective spaced cams 56, 58.

As illustrated herein, the walls 106 are shown in solid plate-like configuration. The walls 106 can have any configuration which will adequately receive and retain the units of product received from product delivery conveyor 12. Thus, a wall 106 could be limited to e.g. two or more fingers extending from the respective base member 64.

It is contemplated that the operation and functions of the invention have become fully apparent from the foregoing description of elements and their relationships with each other, but for completeness of disclosure the usage of the invention will be briefly described.

Referring to FIG. 1, a series of buckets 62 are mounted with their cam followers 68, 70 engaged in the cams 56, 58 in the processing apparatus 10 about the third combined path 60. Frictionally engaging conveyor 38 drives the product buckets 62 into abutting relationship with each other at sprocket 34, where the product buckets are engaged by drive dogs 36 of chain 22, for positive driving at the speed of advance of the chain 22, one bucket behind the other, and in abutting relationship with each other.

As a respective bucket advances upwardly from sprocket 34 toward sprocket 28, it remains in abutting relationship with the product bucket in front of it and the product bucket behind it. As the product bucket advances about the arcuate portion of the path 30, the advance of the respective cam followers 68, 70 in the cams 56, 58 at the arcuate portion, causes each respective wall, or front/rear wall unit, to track a different portion of the arc, thus to extend at an angle from the next frontwardly and rearwardly ones of the adjacent walls, thereby moving the distal ends of the respective walls away from each other, and accordingly enlarging the respective compartments, as illustrated in FIG. 1.

While each compartment is thus enlarged in traversing the arc about the sprocket 28, a unit of product is deposited from the product delivery conveyor 12. Thus the product bucket 62 receives one unit of product 78 into each compartment 76 as it passes the product filling station 84.

As the product bucket moves beyond sprocket 28, the bucket traverses a straight (non-arcuate) portion of the path 60, whereby the walls 106 return to their parallel configuration, and contract about and hold, the units of product in the respective compartments.

At sprocket 32, the drive dog 36 disengages itself from the product bucket, and is pushed by the next following product bucket onto conveyor 38, still being guided by cams 56, 58. On conveyor 38, the top surfaces of drive links 54 frictionally engage the bottom surfaces of the respective base members 64, driving the product bucket 62 toward the discharge end 82 of the conveyor 38. A stop (not shown) at the discharge end of the conveyor 38 holds and accumulates the product buckets until called for by the group processing subsystem 16. As the group processing subsystem 16 calls for one or more bucket, the stop releases the desired number of buckets, which then advance as shown, in spaced relation, on conveyor 86.

Apparatus, not shown, removes the group 80 of units of product 78 from the bucket, for further processing or other handling as a group. The empty bucket then traverses about sprocket 88, still following the guidance of cams 56 and 58, and returns on the bottom of the conveyor 86 to sprocket 90. From sprocket 90, the product bucket is transferred back to the friction drive conveyor 38. Conveyor 38 then frictionally drives the bucket, still guided by cams 56, 58, into abutting relationship with the next leading product bucket for another trip about the path 60, thus to deliver another group 80 of units of product 78 to the group processing subsystem 16.

Figure 5:
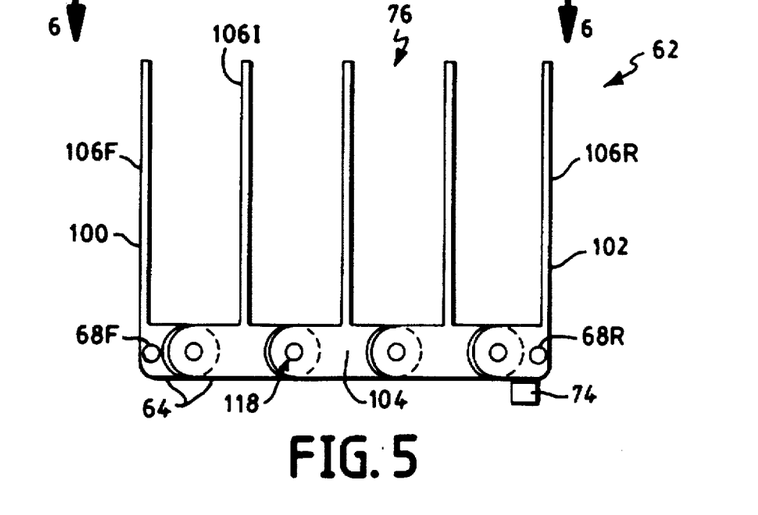
FIG. 5 is a side elevation view of a second embodiment of a product bucket of the invention.
Figure 6:
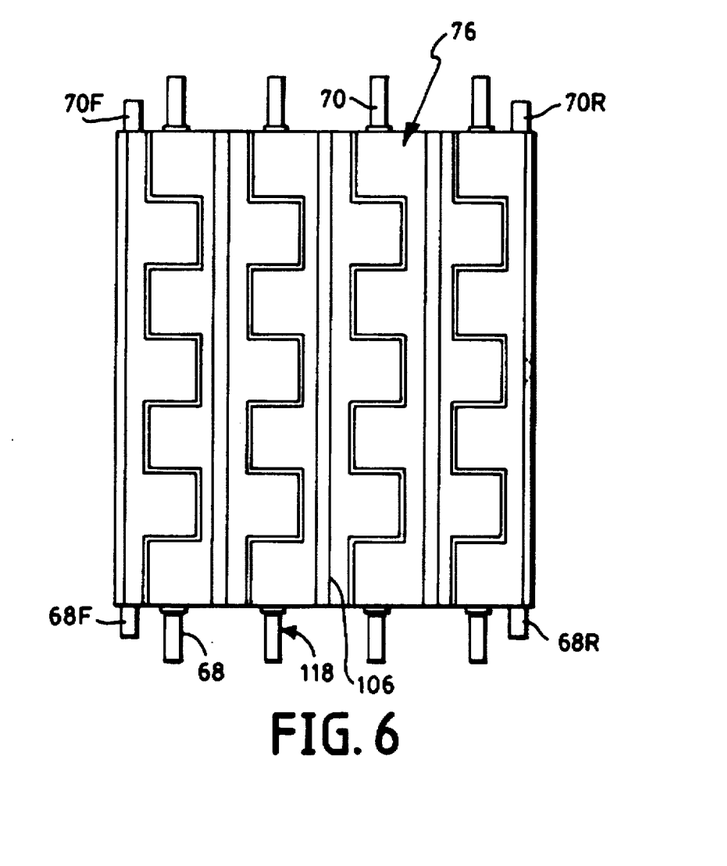
FIG. 6 is a top view of the product bucket of FIG. 5, taken at 6—6 of FIG. 5.

FIGS. 5 and 6 illustrate a second embodiment of the product bucket 62. As seen therein, the product bucket 62 includes a front bucket element 100, a rear bucket element 102, and three intermediate bucket elements 104. Each bucket element has a corresponding base member 64, and a wall 106 extending outwardly from the respective base member. Front and rear walls 106F and 106R respectively are thinner than the intermediate walls 106I, such that the sum of the thicknesses of the front and rear walls corresponds with the thicknesses of the intermediate walls. Drive lug 74 is adapted to be engaged by drive dog 36 on drive chain 22.

The respective bucket elements 100, 102, and 104 are mounted and joined to each other for pivotation with respect to each other by mounting pins 118, the ends of which are corresponding cam followers 68, 70.

Additional front and rear cam followers 68F, 68R, 70F, and 70R are disposed at the corresponding front and rear of the left and right sides of the bucket 62, as shown. Thus, the cams 68F, 68R, 70F, and 70R cause the front and rear walls 106F and 106R to closely track each other to thus keep the front and rear walls of abutting ones of leading and trailing product buckets in close proximity with each other, and in arcuately close spaced relationship with each other, such that product cannot be inadvertently placed between the rear wall of one product bucket and the front wall of the next trailing such product bucket.

Having thus described the invention in full detail, it will be readily apparent that various changes and modifications may be made without departing from the spirit of the invention. All such changes and modifications are contemplated as being within the scope of the present invention, as defined by the following claims.

What is claimed is:

1. An articulated product bucket adapted to be engaged by a driver traveling in a first path, as one of at least a first leading and a second trailing discrete and separate such product buckets engaged by such driver, and to travel along first and second spaced cams extending along a second path, a first portion of the first path corresponding with a second portion of the second path, said articulated product bucket comprising:

(a) a front bucket element having a first base, and a front bucket wall extending outwardly from said first base;

(b) a rear bucket element having a second base, and a rear bucket wall extending outwardly from said second base;

(c) a product-receiving zone between said front bucket wall and said rear bucket wall for receiving product thereinto, said product-receiving zone having at least two compartments, each said compartment being defined by adjacent said bucket elements, each of said bucket elements having corresponding compartment walls extending outwardly from corresponding said bases each such compartment having a front compartment wall and a rear compartment wall, said rear compartment wall on a given said compartment comprising said front compartment wall with respect to the next rearwardly disposed said compartment, said compartment walls in said articulated product bucket comprising said front bucket wall in a first front said compartment, said rear bucket wall in a last rearwardly disposed said compartment, and at least one intermediate said compartment wall between said front bucket wall and said rear bucket wall, said front bucket element being mounted to said articulated product bucket for articulation with respect to said rear bucket element, thereby to articulate said front bucket wall with respect to said rear bucket wall, to thereby enlarge the product-receiving zone for receiving a product thereinto and to contract the product-receiving zone to hold the product therein;

(d) a first cam follower on said front bucket element, adapted to engage the first cam; and (e) a second cam follower on said rear bucket element, adapted to engage the second cam, said first and second cam followers being arranged with respect to said front and rear bucket walls, and with respect to the first and second cams, to urge said rear bucket wall of a leading said articulated product bucket and said front bucket wall of a trailing and abutting said articulated product bucket into proximity with each other while the corresponding leading and trailing articulated product buckets traverse an arcuate path, one immediately behind the other, along the first and second spaced cams, thereby to inhibit product from being inserted between said rear bucket wall of the leading articulated product bucket and said front bucket wall of the trailing articulated product bucket while the corresponding articulated product buckets are traversing the arcuate path.

2. An articulated product bucket as in claim 1, at least one of said front and rear bucket elements including a bottom wall adapted to extend generally transverse to the second path, from said at least one of said front and rear bucket elements toward the other of said front and rear bucket elements.

3. An articulated product bucket as in claim 1, said articulated product bucket having first and second sides, generally adjacent the respective first and second spaced cams, said front bucket element and said rear bucket element, in combination, having first and second cam followers on each of said first and second sides of said articulated product bucket.

4. An articulated product bucket as in claim 1, said articulated product bucket being adapted to traverse the second path, the second path being different from the first path, such that said articulated product bucket is engaged for positive driving by the driver for the corresponding portion of the first and second paths, and is disengaged from the driver for traversing the remainder of the second path.

5. An articulated product bucket as in claim 1, including a drive lug for separably engaging a drive dog on the driver.

6. An articulated product bucket as in claim 1, each such compartment wall having a thickness, the thickness of each said intermediate compartment wall corresponding with the sum of the thicknesses of said front bucket wall and said rear bucket wall.

7. An articulated product bucket as in claim 5, wherein the driver is adapted to accept the drive lug in a predetermined position to maintain the rear bucket wall and the front bucket wall in close proximity during the traversal of at least a portion of the first path.

8. An articulated product bucket as in claim 1, all said compartments having a common overall length.

9. An articulated product bucket as in claim 1, said articulated product bucket having a front and a rear and comprising at least three said bucket elements, said product-receiving zone comprising at least two compartments, each said compartment being defined by adjacent said bucket elements, including corresponding compartment walls on each said bucket element, extending outwardly from corresponding said bases, each such compartment having a front compartment wall and a rear compartment wall, said rear compartment wall on a given said compartment comprising said front compartment wall with respect to the next rearwardly disposed said compartment, said compartment walls in said articulated product bucket comprising said front bucket wall in a first front said compartment, said rear bucket wall in a last rearwardly disposed said compartment, and at least one intermediate said compartment wall between said front bucket wall and said rear bucket wall.

10. An articulated product bucket adapted to be engaged by a driver travelling in a first path, as one of at least a first leading and a second trailing discrete and separate such product buckets engaged by such driver, and to travel along first and second spaced cams extending along a second path, a first portion of the first path corresponding with a second portion of the second path, said articulated product bucket comprising:

(a) a front bucket element having a first base, and a front bucket wall extending outwardly from said first base, said front bucket wall having a first thickness;

(b) a rear bucket element having a second base, and a rear bucket wall extending outwardly from said second base, said rear bucket wall having a second thickness;

(c) a product-receiving zone between said front bucket wall and said rear bucket wall for receiving product thereinto, said front bucket element being mounted to said articulated product bucket for articulation with respect to said rear bucket element, thereby to articulate said front bucket wall with respect to said rear bucket wall, to thereby enlarge the product-receiving zone for receiving a product thereinto and to contract the product-receiving zone to hold the product therein, said articulated product bucket comprising at least three said bucket elements, said product-receiving zone comprising at least two compartments, each said compartment being defined by adjacent said bucket elements, including corresponding compartment walls on each said bucket element, extending outwardly from corresponding said bases, each such compartment having a front compartment wall and a rear compartment wall, said rear compartment wall on a given said compartment comprising said front compartment wall with respect to the next rearwardly disposed said compartment, said compartment walls in said articulated product bucket comprising said front bucket wall in a first front said compartment, said rear bucket wall in a last rearwardly disposed said compartment, and at least one intermediate said compartment wall between said front bucket wall and said rear bucket wall, said at least one intermediate compartment wall having a third thickness;

(d) a first cam follower on said front bucket element, adapted to engage the first cam;

(e) a second cam follower on said rear bucket element, adapted to engage the second cam; and (f) third and fourth cam followers on intermediate ones of said bucket elements between said front and rear bucket elements, adapted to engage the first and second cams respectively, the sum of the first and second thicknesses of said front and rear bucket walls corresponding with the third thickness of said at least one intermediate compartment wall.

11. An articulated product bucket as in claim 10, including a drive lug for separably engaging a drive dog on the driver.

12. A method of receiving a stream of units of product, and separating the stream into discrete groups of product, said method comprising the steps of:

(a) receiving the units in processing apparatus comprising a succession of articulated product buckets, each bucket being adapted to be engaged by a driver traveling in a first path, and to travel along a cam element extending along a second path, a first portion of the first path corresponding with a second portion of the second path, each product bucket having a cam follower for engaging the cam element along the second path, and including a front bucket element having a first base and a front bucket wall extending outwardly from the first base, a rear bucket element having a second base and a rear bucket wall extending outwardly from the second base, a product-receiving zone between the front bucket wall and the rear bucket wall, for receiving product thereinto, said product-receiving zone having at least two compartments, each said compartment being defined by adjacent said bucket elements, each of said bucket elements having corresponding compartment walls extending outwardly from corresponding said bases each such compartment having a front compartment wall and a rear compartment wall, said rear compartment wall on a given said compartment comprising said front compartment wall with respect to the next rearwardly disposed said compartment, said compartment walls in said articulated product bucket comprising said front bucket wall in a first front said compartment, said rear bucket wall in a last rearwardly disposed said compartment, and at least one intermediate said compartment wall between said front bucket wall and said rear bucket wall, the front bucket element being mounted to the articulated product bucket for articulation with respect to the rear bucket element, thereby to articulate the front bucket wall with respect to the rear bucket wall, to thereby enlarge the product-receiving zone for receiving product thereinto, such that each bucket receives a group of such units of product including a unit of product in each compartment;

(b) segregating the groups of product, in respective product buckets, from the product stream; and (c) presenting each group, as a separate group, to a downstream element of the processing apparatus, for further processing.

13. A method as in claim 12, including the step of passing each bucket along an arcuate path, and thereby enlarging the respective compartments in the respective bucket in preparation for receiving the units of product thereinto, and receiving the units of product into the respective compartments while the compartments are so enlarged.

14. A method as in claim 12, including the step of passing each bucket out of the arcuate path after the respective bucket receives product into the respective compartments, and thereby contracting the respective compartments to hold the units of product therein.

15. A method as in claim 12, including engaging each bucket with the driver for a first portion of the first path coincident with the second path, and disengaging the respective buckets from the driver and traversing the buckets along a remaining portion of the second path with the driver disengaged from the respective buckets.

16. A method as in claim 12, the driver comprising a first driver, the method including engaging each bucket for positive driving by the first driver for a first portion of the first path coincident with the second path, and disengaging the bucket from the first driver and engaging the bucket with frictional engagement to a second driver for traversing at least a second portion of the second path.

* * * * *